US007028305B2

(12) United States Patent
Schaefer (10) Patent No.: US 7,028,305 B2
(45) Date of Patent: Apr. 11, 2006

(54) OPERATING SYSTEM ABSTRACTION AND PROTECTION LAYER

(75) Inventor: Stuart Schaefer, Marblehead, MA (US)

(73) Assignee: Softricity, Inc., Boston, MA (US)

( * ) Notice: Subject to any disclaimer, the term of this patent is extended or adjusted under 35 U.S.C. 154(b) by 313 days.

(21) Appl. No.: 09/859,209

(22) Filed: May 16, 2001

(65) Prior Publication Data

US 2002/0174215 A1    Nov. 21, 2002

(51) Int. Cl.
*G06F 15/163* (2006.01)

(52) U.S. Cl. ..................................... 719/310; 718/104

(58) Field of Classification Search .............. 709/328, 709/1; 718/1, 104; 719/328, 329, 310, 312, 719/313
See application file for complete search history.

(56) References Cited

U.S. PATENT DOCUMENTS

| 5,752,005 | A |   | 5/1998 | Jones |        |
|-----------|---|---|--------|-------|--------|
| 5,901,312 | A | * | 5/1999 | Radko | 709/104 |
| 5,961,582 | A | * | 10/1999 | Gaines | 709/1 |
| 6,023,721 | A |   | 2/2000 | Cummings | |
| 6,026,402 | A |   | 2/2000 | Vossen et al. | |
| 6,134,602 | A | * | 10/2000 | Engstrom et al. | 709/328 |
| 6,496,847 | B1 | * | 12/2002 | Bugnion et al. | 709/1 |
| 6,601,081 | B1 | * | 7/2003 | Provino et al. | 709/1 |

FOREIGN PATENT DOCUMENTS

WO    WO 00/46685    8/2000

OTHER PUBLICATIONS

Edouard Bugnion et al, "Disco: Running Commodity Operating Systems on Scalable Multiprocessors", *Proceedings of the 16th Symposium on Operating Systems Principles (SOPS), 'Online!*, Oct. 1997, pp. 1-14, XP002211769.
Mark Russinovich et al, "Windows NT System-Call Hooking", *Dr. Dobb's Journal*, Jan. 1997, pp. 42, 44, 46 and 82, XP001096512.
Rogue Wave Software: "Copy on Write", *Website of Rogue Wave Software, 'Online!*, 1996, XP002211770.

* cited by examiner

*Primary Examiner*—William Thomson
*Assistant Examiner*—Andy Ho
(74) *Attorney, Agent, or Firm*—Wilmer Cutler Pickering Hale and Dorr (57) ABSTRACT

The present invention provides a system for creating an application software environment without changing an operating system of a client computer, the system comprising an operating system abstraction and protection layer, wherein said abstraction and protection layer is interposed between a running software application and said operating system, whereby a virtual environment in which an application may run is provided and application level interactions are substantially removed. Preferably, any changes directly to the operating system are selectively made within the context of the running application and the abstraction and protection layer dynamically changes the virtual environment according to administrative settings. Additionally, in certain embodiments, the system continually monitors the use of shared system resources and acts as a service to apply and remove changes to system components. The present thus invention defines an "Operating System Guard." These components cover the protection semantics required by .DLLs and other shared library code as well as system device drivers, fonts, registries and other configuration items, files, and environment variables.

18 Claims, 4 Drawing Sheets

OPERATING SYSTEM ABSTRACTION AND PROTECTION LAYER

The present invention relates to computer software, and more particularly to operating system software.

BACKGROUND OF THE INVENTION

In many environments, but particularly in environments where an application is delivered via a network, the most important feature is an ability to run applications on the fly, without a complex installation. Typically, in certain prior art systems, great pains were taken to modify a client system to appear as if a program was installed, or to actually install the software itself and then back out these modifications to restore the original configuration. In doing this, mile problems present themselves: conflicts between an application and the computer's current configuration, multiple instances of the same or different applications, complexity of the back out process requires an application to be put through a rigorous process to ensure all of its modifications can be accounted for, and the use of shared files and system components by multiple applications complicates back out and the installation process.

SUMMARY OF THE INVENTION

The present invention provides a system for creating an application software environment without changing an operating system of a client computer, the system comprising an operating system abstraction and protection layer, wherein said abstraction and protection layer is interposed between a running software application and said operating system, whereby a virtual environment in which an application may run is provided and application level interactions are substantially removed. Preferably, any changes directly to the operating system are selectively made within the context of the running application and the abstraction and protection layer dynamically changes the virtual environment according to administrative settings. Additionally, in certain embodiments, the system continually monitors the use of shared system resources and acts as a service to apply and remove changes to system components.

Thus, for example, in embodiments within Windows-based operating systems, and wherein all operations to the Windows Registry are through the Win32 API, the system preferably provides a means for hooking functions, whereby each time said functions are invoked another function or application intercepts the call, and the system most preferably hooks each appropriate API function to service a request whether made by an application run from a server or if made by an application against a configuration key being actively managed In other preferred embodiments of the present invention, additional functionality is provided, such as those embodiments wherein the operating system abstraction and protection layer manages the integration of multiple instances of an application by recognizing how many instances of an application are running, and in such embodiments most preferably it also avoids making changes on startup and shutdown unless there is only one application instance running. In this embodiment it is also possible to support multi-user operating systems in which multiple instances of an application can be running on behalf of different users.

Thus, the operating system abstraction and protection layer presents an environment to an application that appears to be an installation environment without performing an installation, whereby a "pseudo installation" is created in which all of the settings are brought into a virtual environment at the time the application runs. Or in the case of an installed application, acts to dynamically modify the behavior of the application at run-time. Preferred embodiments provide a means for preventing information on the client computer from interfering or modifying the behavior of an application, and most preferably provide a means for dynamically changing the virtual environment according to administrative settings. As mentioned above, in certain embodiments it will be possible to have more than one instance of a single software application running on the same client computer, even if it was not originally authored to do so. In such embodiments, shared, controlled contexts are provided in which at least two of said instances of a single application share one or more virtual settings.

DETAILED DESCRIPTION OF THE PREFERRED EMBODIMENTS

Figure 1:
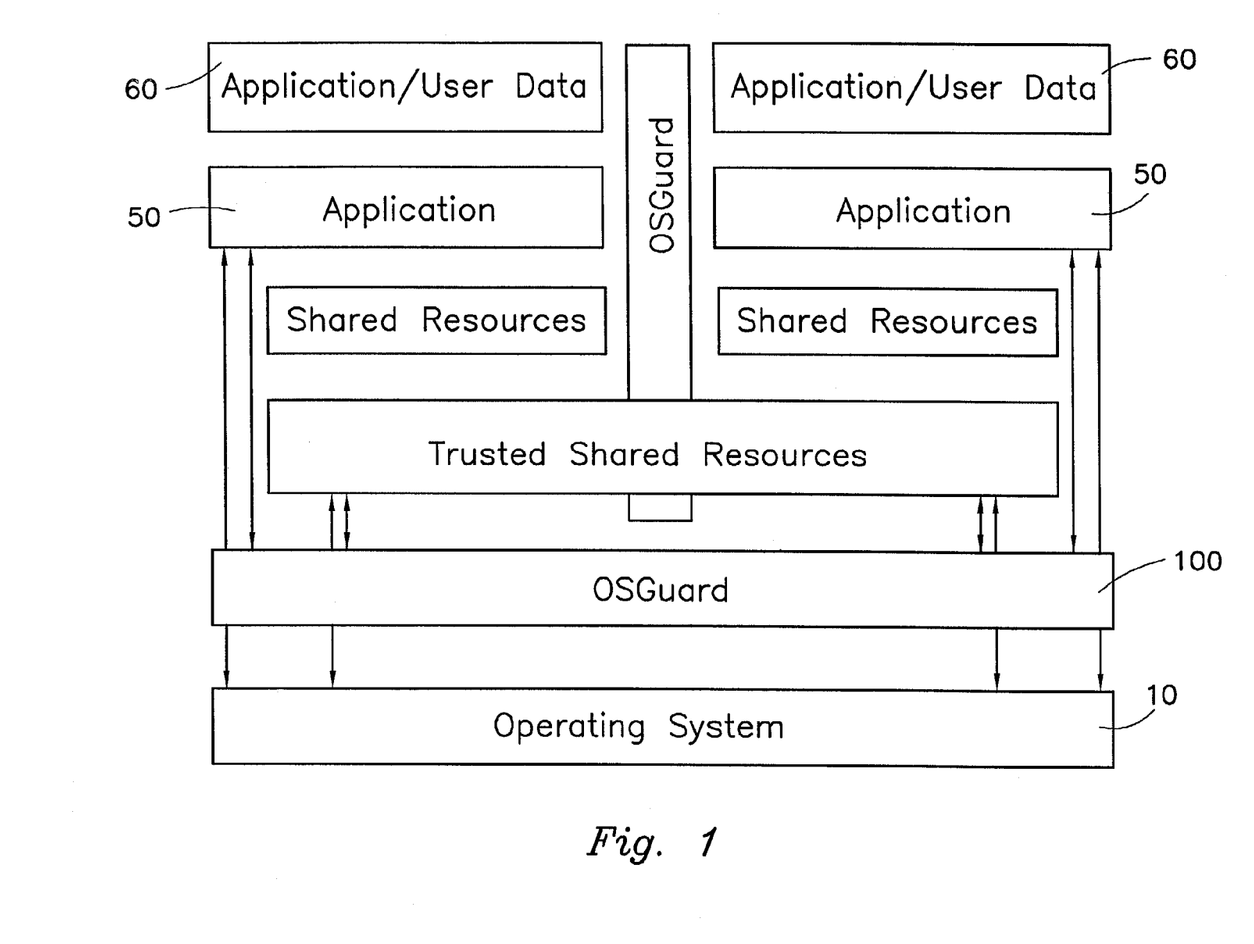
FIG. 1 is a block diagram schematic showing the relative relationship of the present invention, an operating system and a software application.

Referring now to FIG. 1, there is illustrated a block diagram schematic showing the relative relationship of the present invention, an operating system and a software application. Preferred embodiments of the present invention provide an operating system abstraction and protection layer 100 denominated an "Operating System Guard." Internally, many operating systems 10 provide fault domains to protect applications 50 from affecting each other when run. However, shared system resources and many other operating system features allow this protection domain to be compromised. An operating system abstraction and protection layer 100 will provide an additional, programmatically controlled barrier between applications 50 to remove most application level interactions. Disposed between the application 50 and operating system 10 the operating system abstraction and protection layer 100 selectively allows changes directly to the operating system 10, versus containing the change within the context of the running application. For one example, in Windows-based systems, all operations to the Windows Registry are typically done through the Win32 API. As explained below, system functions like QueryRegEx and GetProfileString can be hooked so that each time they are invoked, another function or application intercepts the call. The Operating System Guard 100 of the present invention will hook each appropriate API function to service the request, if made by an application being actively managed or if made by an application against a configuration item being actively managed. In this way, unless explicitly configured to do so, the present invention can create the application environment without making any actual changes to the end-user's system. Also, any modifications made at run-time by the application can be persisted or removed easily.

As used herein the term "Operating System Guard" defines a layer between a running application and the operating system of a target computer or client computer that provides a virtual environment in which an application may run. This virtual environment has several purposes. First, it prevents a running application from making changes to the client computer. If an application attempts to change underlying operating system settings of a client computer, such settings are protected and only "made" in the virtual environment. For example, if an application attempts to change the version of a shared object like MSVCRT.DLL, this change is localized to the application and the code resident on the client computer is left untouched.

Second, the invention presents an environment to a running application that appears to be an installation environment without performing an installation, and is thus a "pseudo installation" or "installation-like." All of the settings are brought into a virtual environment at the time the application being served runs, or just-in-time when the application needs the particular setting. For example, if a computer program such as Adobe Photoshop® expects to see a set of Windows Registry entries under HKEY_LOCAL_MACHINE\Software\Adobe and they are not there on the client computer since Photoshop was never installed, a system made in accordance with this aspect of the present invention will "show" those registry entries to the Photoshop programming code exactly as if they were resident on the client computer.

Next, the invention prevents information that may exist on the client/users machine from interfering with or modifying the behavior of an application. For example, if the user has already existing registry entries under:

HKEY_LOCAL_MACHINE\Software\Adobe for an older version of Photoshop, but now wishes to operate a newer version, these entries can be hidden from the new application to prevent conflicts.

Finally, the present invention unlocks application behavior that may not exist as the application is currently written. It does this through the ability to dynamically change the virual environment according to administrative settings. For example, in a typical instance of an enterprise software application, a client application may expect to read a setting for the address of the database to which the user should connect from a setting in the registry. Because this registry key is often stored in HKEY_LOCAL_MACHINE, the setting is global for the entire client computer. A user can only connect to one database without reinstalling the client, or knowing how to modify this registry key, and doing so each time they wish to run the application. However, by implementing the present invention, two instances of the application may now run on the same client computer, each connecting to a different database.

Contexts

Figure 2:
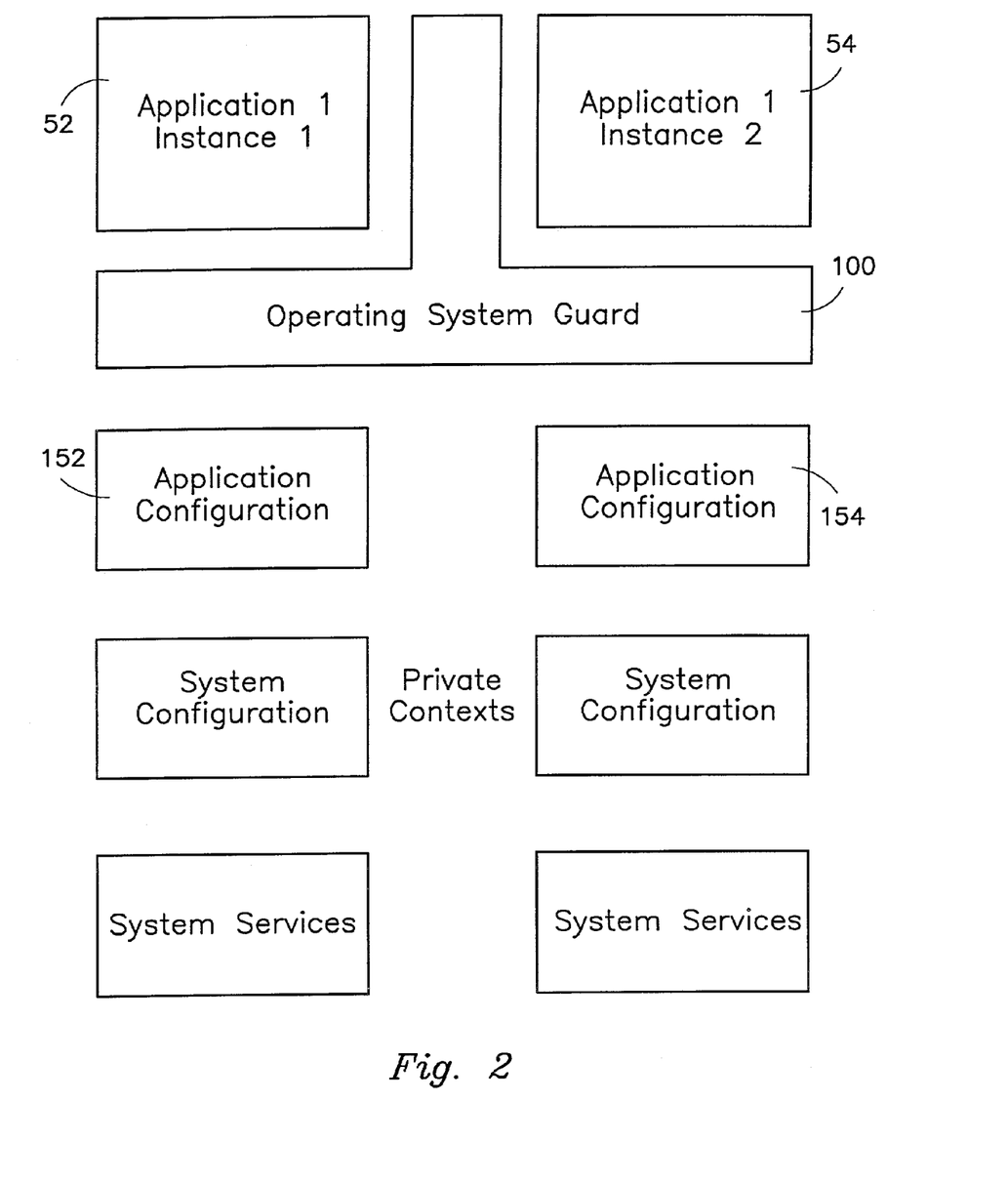
FIG. 2 is a block diagram schematic showing two applications running with private contexts and services.

In providing this functionality, each application is able to run in a private context within the system. To the application, it has its own private view of what the system looks like and its behavior. The present invention provides this by its inherent nature. Referring to FIG. 2, two separate applications 52,54, or two instances of the same application (50 illustrated in FIG. 1), can be provided private contexts in which they will appear to have separate or differing copies of system services, configuration and data. In the preferred embodiment, this is the default behavior of the system.

Figure 3:
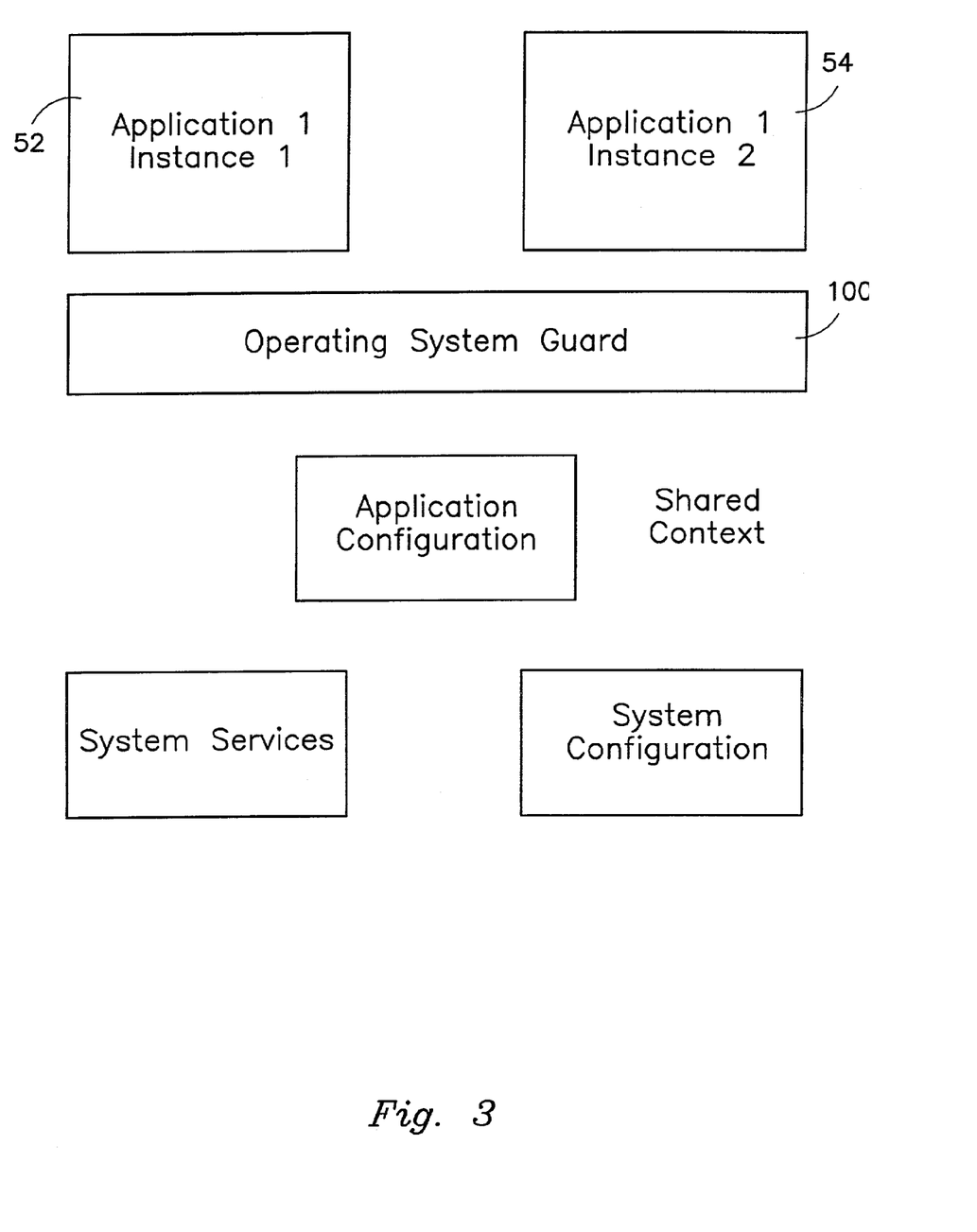
FIG. 3 is a block diagram schematic showing two applications running while the operating system provides shared views of the system resources.

By extending this concept, the Operating System Guard 100 of the present invention can also provide shared, controlled contexts in which two or more applications 52,54 can share some or all of their virtual settings. This is important for application suites such as Microsoft Office, or for applications that perform differently in the presence of other applications. For example, many applications use Microsoft Word as an engine for doing Mail Merge or document creation fuctionality. The application must know about the installation or presence of Word and be able to tap into its functions. In the preferred embodiment, two instances of the same application will share a single context by default, while two separate applications will maintain private contexts. Referring to FIG. 3, the two applications 52,54 can run while the Operating System Guard 100 provides a shared view of the available system resources.

Design

Figure 4:
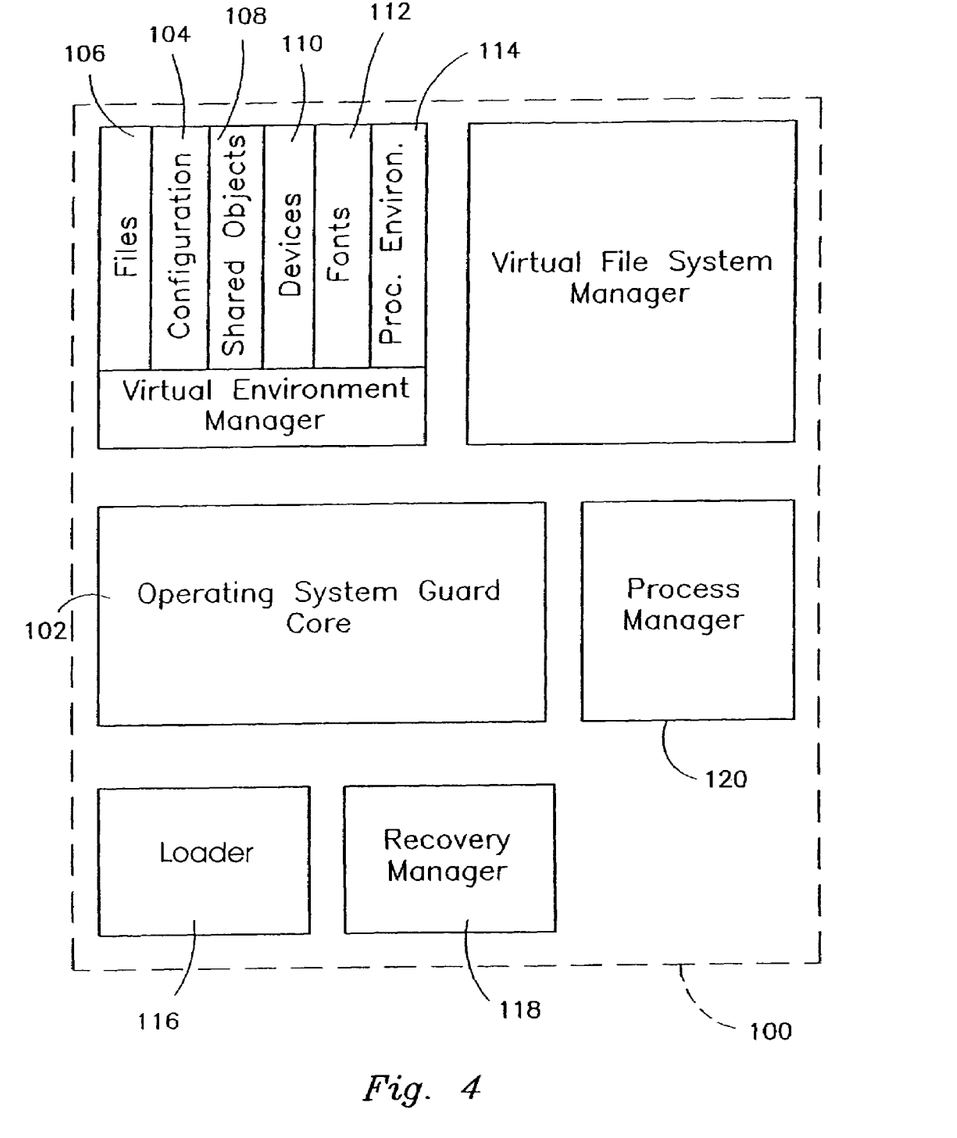
FIG. 4 is a block diagram schematic showing an operating system guard and subsystems.

As illustrated in FIG. 4, the Operating System Guard is comprised of the following subsystems: core 102, configuration manager 104, file manager 106, shared object manager 108, device manager 110, font manager 112, process manager 120, process environment manager 114, loader 116, and recovery manager 118. With the exception of the core 102, the process manager 120, and the loader 116, all other subsystems are elements of the Virtualization System described in further detail below. The core 102 is primarily responsible for managing applications and their context as defined by the configuration files.

The process manager 120 provided by the Operating System Guard allows the core 102 to be informed of any process or thread event that may be of interest. It also provides an abstraction layer to the operating system-dependent implementations for managing a process space and handling thread processing. Processes may be grouped together into application bundles. An application bundle is a group of processes which all share their virtual resources with each other. For example, Microsoft Word and Microsoft Excel may want to share the virtual registry and virtual file system to be able to work together as an application suite. The process manager 120 calls these application bundles "applications". The information about an application exists until the process manager 120 is told to release the application. If another process needs to be loaded into the application bundle, it may do so as long as the application has not been released.

The loader subsystem 116 of the present invention is used to allow virtual environments to be transferred into and out of the running system. Each of the Virtualization Subsystems is capable of serializing its configuration for the loader 116, and retrieving it through the reverse process. In addition, the loader 116 is capable of staged loading/unloading and combining the results of individual stages into one single environment description.

Registry and Configuration

Applications require varying amounts of configuration information to operate properly. Anywhere from zero to thousands of configuration records exist for which an application can read its configuration On Windows, there are two common places for configuration information, the Windows Registry and system level initialization files win.ini and system.ini. In addition, the \WINDOWS\SYSTEM directory is a common place for applications to write application specific configuration or initialization files. Applications will also use configuration or data files in their local application directories to store additional configuration information. Often this information is difficult to deal with, as it is in a proprietary format. On platforms other than Windows, there is no equivalent of the Registry, but common directories exist for configuration information. X Windows has an app-defaults directory. Macintosh has the System Folder, and other operating systems will have corresponding elements. It is important to note that on most UNIX systems, each individual application 52,54 will most often store its own configuration 152,154 locally, as seen in FIG. 2.

The present invention, in one embodiment, includes a virtual Windows Registry component, which will provide a full function registry to an application, but prevent modification to the underlying system registry. All keys that an application expects to access will be present, but may only exist in the virtual registry. In this way, the Operating System Guard 100 of the present invention and the Windows Registry form a two-stage process for accessing the registry. If an application needs access to a key, it will query the Registry. The Operating System Guard will respond with the key and its value if it knows it. Otherwise, it will allow the request to pass through to the Windows Registry. If an attempt is made to modify the value, the Operating System Guard will allow the modification to occur to itself only. The next time the application accesses the key, it will be present in the Operating System Guard and the request will not flow through to the real Registry, leaving it untouched.

The keys that the Operating System Guard uses are specified in three separate sections. These Operating System Guard keys are specified as commands in these sections to modify an existing key, delete the presence of a key, or add a new key to the registry. In this way, the virtual registry can appear exactly as the system intends. This is important as the presence or absence of a key can be as important as the actual value of the key.

In the preferred embodiment, the Operating System Guard first loads a data file that contains basic registry entries for the application. Then a second data file is loaded that contains the user's preferences. Finally, the Operating System Guard can optionally load a set of keys that include policy items that the user is not allowed to override. The three files load on top of each other with duplicate items in each file overriding items in the file before it. The first time a user runs an application, the second data file will not exist because there will be no user-specific information, only application defaults. After each session, though, the Operating System Guard will save the user's changes, generating that second data file for use in future sessions.

Configuration files can be modified in two ways. First, the file can be edited directly by an application. In this scenario, the Operating System Guard File subsystem described below will address the modification made to the file. Second, in the preferred embodiment, an application can call the Windows API family of calls GetProfileString, WriteProfileString, or others to modify these files. In this case, the Operating System Guard of the present invention performs exactly as described above intercepting these calls and servicing them from within.

Shared Objects

Many components used by operating systems and running applications are shared across several applications or instances. In general, this is a very good idea. It saves disk space, not requiring many copies of the same file. It also provides the ability for operating system vendors and third parties to create and distribute libraries of commonly used code. On the Windows platform Dynamic Link Libraries, DLLs, are often shared within and across applications. On other platforms, the problem is the same. On the Macintosh, INITs and other system components are loaded for applications. These components can have many versions, of which only one is used at a time. On UNIX systems, dynamic shared objects, e.g., ".so" library files, are used by applications to speed load time, save disk space, and for other reasons. Many programs use the default "libc.so." However, this library file is typically a symbolic link to some version of itself such as libc.so.3. In practice, this feature has created havoc. These shared components have often gone through revision, with many versions of the same component available to be installed Application authors have found their software to work with potentially only one or some of the versions of the shared component. Thus, in practice, applications typically install the version they desire, overwriting other present versions. This potentially causes defaults in other applications running on a system On Windows 98, Windows 2000, Microsoft has created the Windows Protected File System (WPFS) to allow system administrators to create a file called XXXX.LOCAL in the base directory of an application, where XXXX is the executable file name without the extension. This causes the Windows Loader to alter its method of resolving path references during LoadLibrary executions. This, however, is not sufficient to completely solve the problem. First, setting up the XXXX file is left to the knowledge of the system administrator, which varies widely. Second, a component version must undergo a rewind back to the original, then install this component in the local directory, and then create the ".LOCAL" file. This is not a straightforward process for any but the most basic components placed in WINDOWS\SYSTEM. Also, this solution does not cover all of the needed functionality. During LoadLibrary, Windows uses different path resolution semantics depending on whether the component was resolved as a result of an explicit or implicit LoadLibrary, and also whether a Registry Key exists indicating that it is a named, or well-known, DLL. In this case, the LoadLibrary call will always resolve to the WINDOWS\SYSTEM directory.

DLLs and other shared components also retain reference count semantics to ensure that a component is not touched unless no running applications refer to it. In practice, only applications from the operating system vendor and the operating system itself have done a good job of obeying this protocol.

As a general rule, it is desired to have a shared object always resolve to the correct component. To provide this functionality it is required to understand the version of a component, or range of versions, that an application is able to function with. Then, when the application is to be run, the present invention should ensure that the component is resolved correctly. It is acceptable, in the present invention, to automate the use of WPFS or other operating system provided capability, if desired. In this case, it is necessary to detect needed components and place them in the local file system. This is more complex than just watching installation, as an installation program will often not install a component if the required one is already there.

It is desired to identify a method to ensure that named objects are also loaded correctly. On the Windows platform, MSVCRT.DLL is a significant culprit within this problem area. If multiple versions of this object are maintained, the aforementioned Registry key can be dynamically changed, allowing the LoadLibrary function to resolve the correct component version. Another reasonable method of ensuring correct component loading is the dynamic editing of a process environment to use a valid search path. This search path will ensure that a local component is resolved before a system wide component. Another possible method for resolution of the correct shared object is through the use of symbolic links. A symbolic link can be made for a shared component, which is resolved at run-time by the computer's file system to the needed component. Finally, the actual open/read/close requests for information from a shared object's file can be intercepted by the present invention and responded to dynamically for the correct version of the file which may exist on the local system or within the invention's subsystems.

Several special forms exist. On the Windows platform, OLE, ODBC, MDAC, . . . as well as a number of other vendor specific components, are written to be shared globally among several or all running processes. In the case of OLE, going as far as sharing data and memory space between separate processes. OLE prevents more than one copy of itself running at a time, as do many of these components. OLE also has many bugs and features requiring a specific version to be loaded for a specific application. In the present invention, an application is able to load whatever version of OLE is required, still enabling the shared semantics with other components using the same version of OLE.

In general, unless specifically configured as such, shared objects should be loaded privately to ensure conflict prevention. Nothing about the method used to allow a component to be loaded privately should prevent it from being unloaded cleanly or correctly loading for another software application, whether being actively managed by the Operating System Guard or not. In addition, if the system crashes it is required to recover from this crash to a clean state, not having overwritten or modified the underlying operating system.

Files

Many applications use data files within the application to store configuration entries or other application data. The present invention provides a virtual file system much like the virtual registry described above. Before the application starts, the present invention can load a list of file system changes, including files to hide and files to add to the virtual environment or files to redirect to another within the virtual environment. Whenever the application accesses or modifies any files, the Operating System Guard checks if the file must be redirected, and if so, in the preferred embodiment redirects the request to a location specified in the Operating System Guard configuration.

If an application tries to create a new file or open an existing file for writing on a user's local drive, the Operating System Guard must ensure that the file is actually created or modified in the redirected location. If the application is reloaded at a later time, this file mapping must be reloaded into the Operating System Guard virtual environment. When the request is to modify an existing file, which resides on a user's local drive, the Operating System Guard must copy the file in question to the redirection point before continuing with the request. The redirected files may not be of the same name as the original file to ensure safe mapping of file paths. In the preferred embodiment, INI files are handled in this way to offer maximum system security while allowing maximum application compatibility.

The present invention is particularly useful for applications delivered over a network in such implementations it is important to understand that software applications are made of several kinds of data, where the bulk of the files a software application uses are most preferably mounted on a separate logical drive. Configuration, including both file based and registry based, can be user specific and system wide. The application delivery system used should mark each file for which of these types any file is. This information provides hints to the Operating System Guard system to act on appropriately.

Device Drivers

Many applications use device drivers or other operating system level software to implement some of its functions such as hardware support or low level interactions directly with the operating system. In the present invention, the Operating System Guard will provide the capability of dynamically, and as possible privately, adding and removing these components to an application's virtual environment.

Many device drivers are built to be dynamically loadable. If at all possible, it is the preferred embodiment to load all device drivers dynamically. If a device driver requires static load at boot time, the user must be presented with this knowledge before running the application. Once the system has rebooted, the application should continue from where it left off. However, a large percentage of device drivers are not dynamically unloadable. Although it is preferred to dynamically unload the driver, if this cannot be accomplished the driver will be marked for removal on the next reboot, and the user should be made aware of this. If the application is run a second time before the next reboot, the system should remain aware of the presence of the driver and not attempt a second installation, waiting for termination to remark the component removable at next reboot.

It is important to characterize the base similarities and differences, as they exist for each device driver class, to ensure the present invention can correctly function. It is not truly desired to load and unload device drivers for system hardware that is constantly present. It should be understood that although this is not a preferred embodiment in terms of programming ease, it is within the scope of the present invention and may be required for specific reasons, such as the restriction in licensing agreements for applications that are delivered and run using the present invention.

On non-Microsoft platforms, device drivers are typically handled very differently. Macintosh systems support both static and dynamic drivers, but they are all installed and removed through the same method. Linking with the Macintosh system folder will provide the necessary support. For UNIX systems, device drivers most typically require a modification to the running UNIX kernel, followed by a reboot. This process can be very complex. In the preferred embodiment, this process is automated; including resetting the kernel once the application is complete. The general parameters of the process are the same as that described above for Windows applications, the actual process steps of compilation and persons familiar with such operating systems can carry out reboot.

Finally, those of skill in the art will understand that it is desirable to be able to recover and remove drivers across system failures. Whatever data or processes necessary to retain system integrity are therefore a preferred embodiment of the present invention. Those of skill in the art will also appreciate that all types of device drivers might not be conveniently or efficiently provided via the present invention, most particularly those associated with permanent hardware attached devices.

Other Items

In the present invention, it is recognized that there are several components of the invention, the behavior or presence of which is different on alternate operating systems. These components include fonts, processes, environment variables, and others.

Some applications require fonts to be installed in order to perform correctly. Any fonts required will be specified in the Operating System Guard's configuration file. The Operating System Guard will enable these fonts prior to running the application and if necessary remove them afterwards. Most systems have a common area for storage of fonts in addition to a process for registering them or making the system aware of their presence, the Operating System Guard will utilize these available methods.

On Windows, a font is copied to the \WINDOWS\FONTS directory. This however does not guarantee that the font is available to the running program. In the preferred embodiment, if the program uses the Windows API to access fonts, the font will need to be registered with a Win32 API call such as CreateScalableFontResource/AddFontResource. This will insert the font into the system font table. Once complete, the Operating System Guard can remove the font with another appropriate API call like RemoveFontResource, then remove the file from the system. As an alternate embodiment, the Operating System Guard could hook the API functions as described in the virtual registry method. In addition, the Operating System Guard can use its File subsystem to avoid placing the actual font file in the running system.

On Macintosh, the process is extremely similar and based on files in the Macintosh system folder and registration activation. On UNIX, however, the process is dependent upon the application. Most typically, font resources are added to the system as regular files resolved in the proper location, so they can be accessed by name. With many Motif systems, a font description needs to be placed into a font resource file, which will allow the font to be resolved. The Motif or X application can invoke the font either through the resolution subsystem or by a direct call. Recently, many Motif and CDE based systems utilize Adobe scalable postscript fonts. These fonts need to managed through the Adobe type management system. There are exceptions, however, and as stated above, there are alternates to the Windows or other operating system default font management systems. The Adobe Type Manager provides some alternate interfaces for this process, as do other third party type management systems. In most cases it should be decided whether to support the interface or ignore it. The purpose of Operating System Guard is not to provide a universal layer for all these systems, only to do so for the operating system's own subsystem Many applications require environment variables to be set. This is most common on UNIX systems, but is also heavily used by software, which was originally written on UNIX and ported to the Windows operating systems. Applications on the Windows operating systems heavily rely on the DOS PATH environment variable and often set their own application specific entries. On the Windows 9x/Me environments, there are many environment settings, which are applicable as at its core is the DOS subsystem. If an application requires the presence of specific variables, or values to be set in existing environment variables, the required environment variables will be specified in the Operating System Guard's configuration file. The Operating System Guard will set these variables for the application's main process when it is launched. As applications do not typically change environment settings as they operate, the virtual environment will not trap these calls, nor will it provide the full complement of functionality that the registry and configuration subsystem does.

Recovery

In some cases shown in the previous sections, actual modifications must be made to the operating system. This is frequent with device drivers and fonts. In addition, changes can be made to the virtual environment that need to be persisted and available the next time an application is run. It is required that the Operating System Guard system be able to recover from changes to the system, removing the change from the system at its earliest possible opportunity. Alternately, if the system crashes during an application's execution, the Operating System Guard should track enough information to remove any change to the system if it is rebooted or otherwise, and should track the changes made to the virtual environment. In the preferred embodiment, this is implemented as a transaction log, but can in other embodiments be done as some other similar component, which can be read on system startup so that changes can be backed out.

Controlling Virtualization

An important aspect of the invention relates to control of the many facets of virtualization which the Operating System Guard is capable of. In the preferred embodiment there exists an instrumentation program able to ascertain the correct aspects of a software system to control. Also included is a method to allow administrators and end users to view and modify those items to be virtualized by the system.

In the automated program, the application to be controlled is observed in order to gauge the aspects of control. The automated program is capable of performing this task during the installation process of the application, during run-time of the application, or a combination of both. In the preferred embodiment, the Operating System Guard is embedded in a wrapper application. Post installation, or after one or many uses of the software, the wrapper application will query the Operating System Guard for a detailed list of all of its actions. From this list of actions, the wrapper application will create the configuration files required to load and operate the Operating System Guard on subsequent uses.

If used as part of the installation process, the Operating System Guard, in the preferred embodiment, will act as a virtual layer allowing the installation to be entered into its environment only. After the installation, all of the files, settings, et. al. can be dumped for reload later. In this way, the installation will leave the original system intact and will have automatically created the necessary configuration files. When used during use of the application, the Operating System Guard is able to record either differential modifications to the environment, or recodify the configuration files.

The Operating System Guard will pass its information to the wrapper application for post-processing. In the preferred embodiment, in addition to the automatic entries that the system can create, the wrapper application is programmed with operating system specific and application or domain specific knowledge. This knowledge is used to alter the output of the process to reflect known uses of configuration items or other entries. In the preferred embodiment, a rules-based system is employed to compare observed behaviors with known scenarios in order to effect changes to the coding.

The wrapper application is also used as a viewer and/or editor for the configuration output of the process. This editor, in the preferred embodiment, enables a system administrator to add, edit, or delete items or groups of items from the configuration. In observing the configuration through the editor, the administrator can also make replicas of the configuration, changing specific items as needed to effect application level or user custom changes.

Referring now to FIG. 1, an embodiment of the present invention is illustrated functionally. In this embodiment, two sets of application/user data 60 are illustrated. The Operating System Guard 100 keeps the two instances of the application 50 from interfering with one another. In addition, as explained above, the operating system guard 100 serves as an abstraction layer and as such collects commands and communications between the application software 50 and the actual operating system 10 of the client computer. As illustrated graphically by the arrows, certain commands are between the Operating System Guard and the software application, this is in distinction to typical installations where these commands would instead be acted upon by the operating system itself, resulting in changes to the client computer that might not necessarily be what the operator intended. On the other hand, other commands pass through the Operating System Guard and are then transferred to the Operating System itself.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for providing one or more application environments on a client computer, the system comprising:
   an operating system protection layer, executing on an operating system of the client computer, one or more applications executing on said operating system, the operating system protection layer comprising one or more subsystems, wherein said protection layer is provided between one or more applications and said operating system and between each of the one or more applications, wherein the protection layer providing each of the one or more applications with its respective virtual operating environment in which each of the one or more applications execute, wherein said respective virtual operating environment appears to each of the one or more applications to be an installation environment without performing an installation, whereby a "pseudo installation" is created in which at least one of the settings are brought into the respective virtual operating environment at the time the one or more applications executes, and wherein the operating system protection layer comprises a virtual registry that provides a full function registry to each of the one or more applications.

2. The system of claim 1, wherein the operating system protection layer continually monitors the use of shared system resources and mediates at least one of said shared system resources to each of the one or more applications.

3. The system of claim 1, wherein the said operating system is a Windows-based operating system.

4. The system of claim 1, wherein the operating system protection layer intercepts each operating system request whether made by an application executing directly on the operating system or made by said one or more applications in the respective virtual environment.

5. The system of claim 1, wherein said operating system protection layer manages the integration of multiple separate instances of an application.

6. The system of claim 1, wherein the operating system protection layer prevents information on the client computer from interfering or modifying the behavior of each of the one or more applications.

7. The system of claim 1, further comprising an interface for dynamically changing the respective virtual environments during at least one of prior to, during, or post the execution of each of the one or more applications.

8. The system of claim 1, wherein more than one instance of a single application executes on the client computer, and wherein each of said more than one instance of the single application operates with a different configuration than the other instances of the single application.

9. The system of claim 1, wherein the operating system protection layer responds to a request with a resource if said resource is stored within the operating system protection layer, and if not stored, the operating system protection layer allows the request to pass through to the underlying system registry, wherein said resource comprises one or more of said subsystems of the operating system protection layer.

10. The system of claim 9, wherein if an attempt is made to modify the resource, the operating system protection layer allows the modification to occur to the respective appropriate virtual environment only.

11. The system of claim 1, wherein a first of the one or more applications and a second of the one or more applications are two different versions of a same application program.

12. The system of claim 1, wherein the operating system protection layer further comprises a data file, stored in memory coupled to the client computer, the data file containing data and configuration information for providing the one or more virtual environments.

13. The system of claim 1, further comprising a logically protected computing environment under control of the operating system protection layer, the logically protected environment including a substantially duplicative resource corresponding to a system resource needed by at least one of the one or more applications, said duplicative resource allowing the one or more applications to execute without affecting the corresponding system resource.

14. The system of claim 1, wherein each of the respective virtual execution environments are a plurality of logically protected environments for protected operation of a corresponding plurality of applications, each within its own logically protected environment.

15. A method for executing one or more application programs, comprising:
   providing a computer system having an operating system therein, the operating system having access to and brokering the use of system resources;
   executing a protective program on the operating system, the protective program providing a customized logically protected environment for running one or more application programs, wherein said customized logically protected environment appears to each of the one or more application programs to be an installation environment without performing an installation whereby a "pseudo-installation" is created in which at least one of the settings are brought into the respective logically protected environment at the time the one or more application programs execute, and wherein the protective program comprises a virtual registry that provides a full function registry to each of the one or more application programs;

executing one or more application programs adapted for use on the operating system in a respective one or more customized logically protected environments;

controlling interactions between the one or more application programs and the operating system it is adapted to run on, including controlling interactions between the one or more application programs and system resources of the computer system and controlling interactions between the one or more application programs; and servicing at least some requests from the one or more application programs using the protective program without transferring the requests to the underlying operating system.

16. The method of claim 15, further comprising installing the one or more application programs in the logically protected environment without permitting the installation to alter the computer system outside the logically protected environment.

17. The system of claim 1, wherein the subsystems comprise one or more of a process manager, a virtual file system manager, a loader, a recovery manager and a virtual environment manager.

18. The system of claim 17, wherein the virtual environment manager comprises one or more of subsystems including configuration, files, shared objects, devices and fonts.

* * * * *